(12) United States Patent
Vega et al.

(10) Patent No.: US 6,282,407 B1
(45) Date of Patent: Aug. 28, 2001

(54) ACTIVE ELECTROSTATIC TRANSCEIVER AND COMMUNICATING SYSTEM

(75) Inventors: Victor Allen Vega, Hercules; John Howard Rolin, San Jose, both of CA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/226,065

(22) Filed: Jan. 5, 1999

Related U.S. Application Data

(63) Continuation-in-part of application No. 09/061,146, filed on Apr. 16, 1998.

(51) Int. Cl.$^7$ ...................................................... H04B 5/00
(52) U.S. Cl. ................... 455/41; 455/73; 455/343
(58) Field of Search ................................. 455/41, 73, 76, 455/77, 78, 82, 83, 38.3, 343; 340/825.54

(56) References Cited

U.S. PATENT DOCUMENTS

| | | |
|---|---|---|
| 5,175,418 | 12/1992 | Tanaka . |
| 5,426,667 * | 6/1995 | Van Zon ................................ 455/41 |
| 5,528,222 | 6/1996 | Moskowitz et al. . |
| 5,566,441 | 10/1996 | Marsh et al. . |
| 5,682,143 | 10/1997 | Brady et al. . |
| 5,724,651 * | 3/1998 | Takahashi et al. .................... 455/343 |
| 5,786,626 | 7/1998 | Brady et al. . |
| 5,847,447 | 12/1998 | Rozin et al. . |
| 5,850,187 | 12/1998 | Carrender et al. . |
| 5,854,480 | 12/1998 | Noto . |
| 5,909,463 * | 6/1999 | Johnson et al. ......................... 455/73 |
| 5,914,701 * | 6/1999 | Gersheneld et al. ................... 455/41 |
| 6,001,211 | 12/1999 | Hiroyuki . |

* cited by examiner

*Primary Examiner*—Reinhard J. Eisenzopf
*Assistant Examiner*—Sam Bhattacharya
(74) *Attorney, Agent, or Firm*—Terri S. Hughes

(57) ABSTRACT

An active electrostatic transceiver is provided that has electrostatic electrodes, an energy storage means such as a battery and a transceiver circuit for communication within an electrostatic RFID communication system. The transceiver circuit includes power management features so that the energy storage means is not quickly depleted. Additionally the transceiver circuit includes amplifiers and filters so that the read range is further increased and noise sources are better filtered out. In a first embodiment, the transceiver circuit has a clock extractor that extracts a clock from the incoming data signal such that the clock and the data signal are synchronized so that demodulating the data from the data signal is simplified. In a second embodiment, the transceiver circuit has its own clock generator for initiating transmission of signals so that a reader need not have an exciter to generate an excitation signal. Each embodiment of the transceiver circuit has power management features so that power is conserved. Additionally, each transceiver circuit has the ability to operate in a passive mode, when there is insufficient charge in the energy storage means or a lower power mode is desirable.

39 Claims, 10 Drawing Sheets

FIG. 8B

ACTIVE ELECTROSTATIC TRANSCEIVER AND COMMUNICATING SYSTEM

CROSS REFERENCE TO RELATED APPLICATIONS

This is a continuation in part of a prior U.S. patent application Ser. No. 09/061,146, filed Apr. 16, 1998 by inventors Ted Geiszler et al, titled "Remotely Powered Electronic Tag with Plural Electrostatic Antennas and Associated Exciter/Reader and Related Method; Radio Frequency Identification Tag System Using Tags Arranged for Coupling to Ground; Radio Frequency Identification Tag Arranged for Magnetically Storing Tag State Information; and Radio Frequency Identification Tag with a Programmable Circuit State" and assigned to Motorola, Inc. the disclosure of which prior application is hereby incorporated by reference, verbatim and with the same effect as though it were fully and completely set forth herein.

Additionally, this application is related to U.S. patent application Ser. No. 09/225,265, filed on an even date herewith by Victor Vega and John Rolin, titled "WIRELESS ELECTROSTATIC CHARGING AND COMMUNICATING SYSTEM" which is to be commonly assigned to Motorola, Inc. the disclosure of which is hereby incorporated by reference, verbatim and with the same effect as though it were fully and completely set forth herein.

FIELD OF THE INVENTION

This invention relates to near field wireless communication systems and more particularly to radio frequency identification (RFID) systems and RFID transceivers or transponders.

BACKGROUND OF THE INVENTION

Radio Frequency Identification (RFID) technology allows identification data to be transferred remotely which provides a significant advantage in identifying persons, articles, parcels, and others. In general, to access identification data stored in a RFID transponder (a.k.a. a tag) remotely, a RFID reader generates an energy field to activate the RFID transponder and subsequently to retrieve data stored in the transponder unit from a distance. The data retrieved is then processed by a host computer system to identify the person or article that is associated with the transponder. RFID technology has found a wide range of applications including tracking, access control, theft prevention, security, etc. An example of an application of RFID technology is for article theft prevention in retail stores and libraries.

For some applications, RFID technology is more preferable than magnetic strip technology, which also finds applications in a few of the areas above. The reason is systems employing RFID technology can store a lot more information than magnetic strip technology. Magnetic strip technology as commonly deployed is capable of storing only a few bits of information (e.g., typically indicating whether or not authorization is allowed). Accordingly, magnetic strip technology is not used in applications where data is required to make an identification such as name, date of birth, etc.

RFID technology should be distinguished from Radio ID technology which uses ordinary radio waves, or more precisely far field electromagnetic (EM) waves which are also known as radiation waves. Far field means the distance between the transceiver and transponder is great compared to the wavelength of the electromagnetic carrier signal used. An example of Radio ID technology is the Identify—Friend or Foe (IFF) systems used with military aircraft. Far field electromagnetic waves have a field strength that varies inversely with the distance involved.

In contrast, conventional RFID technology is inductance-based. More precisely, conventional RFID technology uses near field electromagnetic waves which are also known as induction waves. Unlike radio waves, the field strength of induction waves is proportional to the inverse square of the distance involved. In inductance-based RFID technology, an electromagnetic field is generated for use both as a power source for the transponder and for transferring information between the reader and transponder. Inductance waves are generated using closed circuit alternating current coils that have multiple turns. Inductance coils are required to optimally transmit and receive electromagnetic signals are usually a wire wound or etched metal coil. Using inductance coils adversely impacts the costs, manufacturability, and packaging flexibility of inductance-based RFID technology particularly when used with high number of RFID tags usually required in a system. Due to the prohibitive costs and high degree of manufacturing difficulty, electromagnetic RFID technology is not practical in high volume and low cost applications such as in disposable applications. The bulky packaging, which is typical for electromagnetic RFID, further limits its application to those where thickness is not of primary importance.

Traditionally electromagnetic transponders in electromagnetic RFID systems derive their power from the electromagnetic signals being transmitted by an electromagnetic reader through induction coupling and have no power storage device. These electromagnetic transponders are often referred to as passive electromagnetic transponders. Because they require inductive coupling, the distance for communication between an electromagnetic reader and a passive electromagnetic transponder, referred to as the read range, is limited. The read range is limited because a sufficient amount of charge to power up the components within a passive electromagnetic transponder is required and is only available within certain distances from the electromagnetic reader.

Additionally, only certain amounts of power are available for components within a passive electromagnetic transponder. This limited amount of power constrains the choices of components used within a passive electromagnetic transponder. For example amplifiers may be restricted in their power consumption and gain or they may not be used at all within a passive electromagnetic transponder. Additionally certain passive components are often used due to the limited power and take up larger amounts of space than otherwise might be required. Furthermore the limited of amount of available power in a passive electromagnetic transponder reduces the available functionality and operation of a transponder.

Additionally when using passive electromagnetic transponders, the electromagnetic readers are required to generate very high electromagnetic field strengths in order to achieve an adequate operating range. Oftentimes when generating these high electromagnetic field strengths electromagnetic interference (EMI) occurs to other radio frequency devices that may be communicating near by. Noise tends to cause problems in low power signals that a passive electromagnetic transponder generates. Furthermore, receiver technology within an electromagnetic reader can not be as sensitive as it otherwise might be due to noise sources that surround transmission of signals to the passive technology employed in the passive electromagnetic transponder.

In certain applications it is desirable to have an RFID communication system with larger read range than available with passive electromagnetic transponders. Typical read range for passive electromagnetic transponders is on the order of four inches to thirty inches. An exemplary application for larger read range is a ticket admittance system. It may be desirable to have a reader be quite a distance away, such as five to eight feet, when a ticket holder passes through an entrance of the ticket admittance system. In cases such as this, it is difficult to bring an electromagnetic transponder within the passive read range.

Thus it is desirable to have an apparatus, system and method for increasing the read range for an RFID communication system. It is desirable to increase the choices of components available for use in an RFID transponder. It is desirable to further integrate components of an RFID transponder such that manufacturing costs are lowered. Additionally, it is desirable to increase the operational functionality of RFID transponders. It is desirable to reduce interference within an RFID communication system so that more sensitive receivers in an RFID reader may be developed. Additionally, it is desirable to introduce an RFID apparatus, system, and method that is cost-effective, has high manufacturability, and can be easily packaged for a wide range of applications including a disposable RFID tag or transponder.

BRIEF SUMMARY OF THE INVENTION

Briefly, an active electrostatic transceiver is provided that has electrostatic electrodes, an energy storage means such as a battery and a transceiver circuit for communication within an electrostatic RFID communication system. The transceiver circuit includes power management features so that the energy storage means is not quickly depleted. Additionally the transceiver circuit includes amplifiers and filters so that the read range is further increased and noise filtering is improved. In a first embodiment, the transceiver circuit has a clock extractor that extracts a clock from the incoming data signal such that the clock and the data signal are synchronized so that demodulating the data from the data signal is simplified. In a second embodiment, the transceiver circuit has its own clock generator for initiating transmission of signals so that a reader need not have an exciter to generate an excitation signal. Both embodiments of the transceiver circuit have power management features that can decrease power consumption.

It is an object of the present invention to provide an active electrostatic transceiver for an RFID communication system in order to increase read range.

Another object of the present invention is to introduce power conservation techniques into an active electrostatic transceiver so that the read range between the electrostatic reader and electrostatic transceiver may be increased.

A still further object of the present invention is to provide an active electrostatic transceiver so that greater operational functionality is available to the RFID communication system.

A still further object of the present invention is to lower interference with other communication devices.

Another object of the present invention is to introduce adaptable lower cost RFID technology with improved manufacturability.

BRIEF DESCRIPTION OF THE DRAWINGS

FIG. 8B is a block diagram of the active electrostatic transceiver of FIG. 7 illustrating details of the analog interface module block using analog timing elements.

DETAILED DESCRIPTION OF THE PREFERRED EMBODIMENTS

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

The present invention includes a method, apparatus and system for providing electrostatic communication utilizing capacitance-based technology with active and passive electrostatic transceivers. Passive electrostatic transceivers derive their power from electrostatic signals being transmitted by an electrostatic reader or other electrostatic signal source. An active electrostatic transceiver has its own internal power source and need not rely on an electrostatic signal source from an electrostatic reader or other source to power up and perform certain functions. Electrostatic communication is accomplished through capacitive coupling which requires no physical contact or wires between a reader and an electrostatic transceiver (a.k.a. electrostatic tag or electrostatic transponder). In the electrostatic communication system, the voltage applied to the capacitively coupled plates is an AC voltage generated by an electric field (i.e. an electrostatic ("ES") field is developed) as opposed to an electromagnetic ("EM") field in order for a charge or signal to be communicated. In short, an electrostatic field is an energy (electrical) field created between two electrodes having a voltage differential. An electrostatic transceiver needs to be in the proximity of the reader, referred to as the read range, in order to have sufficient capacitive coupling to transceive electrostatic signals.

Briefly, an active electrostatic transceiver is provided that has electrostatic electrodes, an energy storage means, such as a battery, and a transceiver circuit for communication within an electrostatic RFID communication system. The transceiver circuit includes power management features so that the energy storage means is not quickly depleted. Additionally the transceiver circuit includes amplifiers and filters so that the read range is further increased and noise filtering is improved. In a first embodiment, the transceiver circuit has a clock extractor that extracts a clock from the incoming data signal such that the clock and the data signal are synchronized so that demodulating the data from the data signal is simplified. In a second embodiment, the transceiver circuit has its own clock generator for initiating transmission of signals so that a reader need not have an exciter to generate an excitation signal. Both embodiments of the transceiver circuit have power management features that improve power conservation.

Figure 1:
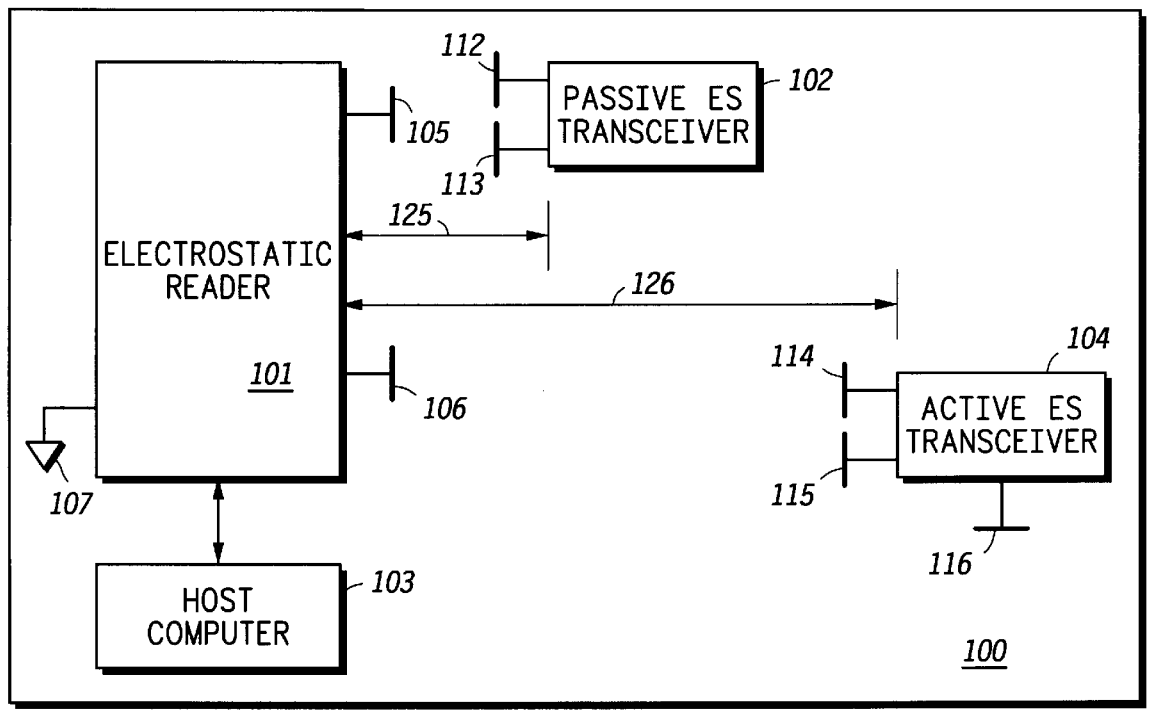
FIG. 1 is a system level diagram illustrating a typical electrostatic radio frequency system of the embodiments of the present invention.

FIG. 1 illustrates the preferred embodiment of the combined electrostatic communication system 100 which includes an electrostatic reader 101, a passive electrostatic transceiver 102, host computer system 103 and an active electrostatic transceiver 104. Electrostatic reader 101, illustrated in a monopole configuration, includes an electrostatic electrode 105 for transmission of an excitation signal and modulated data signals on a carrier by means of electrostatic energy. The signals are transmitted by the reader to either an electrostatic transceiver, transponder, tag, badge, smart card, or other such RFID transceiver such as passive electrostatic transceiver 102 or active electrostatic transceiver 104. Electrostatic reader 101 includes an electrostatic electrode 106 for receiving data signals on a carrier by means of electrostatic energy. The data signals are communicated by either a passive electrostatic transceiver such as passive electrostatic transceiver 102 or active electrostatic transceiver 104. The passive electrostatic transceiver 102 includes at least two electrostatic electrodes 112 and 113 in order to communicate using electrostatic signals. The electrostatic electrodes 112 and 113 may have differing shapes and be made of different materials. Some of the shapes for the electrostatic electrodes 112 and 113 include flat rectangular plates and bow tie shaped plates. The active electrostatic transceiver 104 includes at least two electrostatic electrodes 114 and 115 in order to receive electrostatic energy and communicate using electrostatic signals. As illustrated in FIG. 1, active electrostatic transceiver 104 includes an additional electrostatic electrode 116 for transmitting electrostatic signals. The electrostatic electrodes may also be referred to as antenna, capacitor plates, contactless electrodes, wireless electrodes or isolation electrodes. These electrostatic electrodes provide for the antenna, contactless, wireless and the somewhat isolated functionality of an electrostatic system which requires no physical contact between the electrostatic electrodes in order to communicate. Passive electrostatic transceiver 102 and active electrostatic transceiver 104 can communicate information to/from the electrostatic reader 101 by means of electrostatic signals and capacitive coupling. Host computer 103 is coupled to the electrostatic reader 101 and may couple to other electrostatic readers, electromagnetic readers or electrostatic readers (not shown in FIG. 1) in order to have other points of communication.

FIG. 1 illustrates the advantage that an active electrostatic transceiver 104 has over a passive electrostatic transceiver 102. The distance between an electrostatic transceiver and an electrostatic reader where communication may start to occur is referred to as the read range. In FIG. 1 the passive read range 125 between passive ES transceiver 102 and ES reader 101 is significantly smaller than the active read range 126 between active ES transceiver 104 and ES reader 101. This is because an energy storage means within the active electrostatic transceiver 104 allows for active transmission of signals using an amplifier. Because of its passive nature, the passive electrostatic transceiver 102 relies on a load modulation technique for communication of signals by reflecting back the energy of the excitation signal to the electrostatic reader 101. The reflection of the excitation signal requires that the passive electrostatic transceiver 102 be nearer the reader 101. The larger read range provided by reflected ES signals using load modulation or transmitted ES signals using an active transmitter allows the active electrostatic transceiver 104 to be used in other applications of RFID communication systems where a passive electrostatic transceiver 102 would not.

An active electrostatic transceiver 104 is not simply formed by adding an energy storage means to the passive electrostatic transceiver 102. Components of a passive electrostatic transceiver require modification, particularly in the area of power management. The power or energy of an energy storage means must be conserved and properly managed in order for the active electrostatic transceiver to have greater utility. Additionally noise must be properly filtered out to avoid false signal detection and power inadvertently being applied to circuits within the active electrostatic transceiver in order to more properly conserve power.

Electrostatic electrodes 112 and 113 of passive ES transceiver 102 and ES electrodes 114 and 115 of active transceiver 104 are one part of the capacitive plates for capacitive coupling in order to receive electrostatic charges and communications. The other part of the capacitive plates are provided by the electrostatic reader 101 or other ES source. The space between the coupled electrostatic electrodes defines the dielectric medium between the two parts of the capacitive plates. The capacitive plates of the electrostatic reader 101 can be in either a monopole or a dipole configuration. In a monopole configuration, only one set of coupling plates is used. Earth ground acts as a low impedance return path. The electrostatic transceiver may couple to earth ground through a human body or other relatively low impedance that couples to one or the other of the electrostatic electrodes. In a dipole configuration the reader had two electrostatic electrodes for receiving and two electrostatic electrodes for transmitting and none of the electrostatic electrodes has a preferential coupling path to earth ground.

Figure 2:
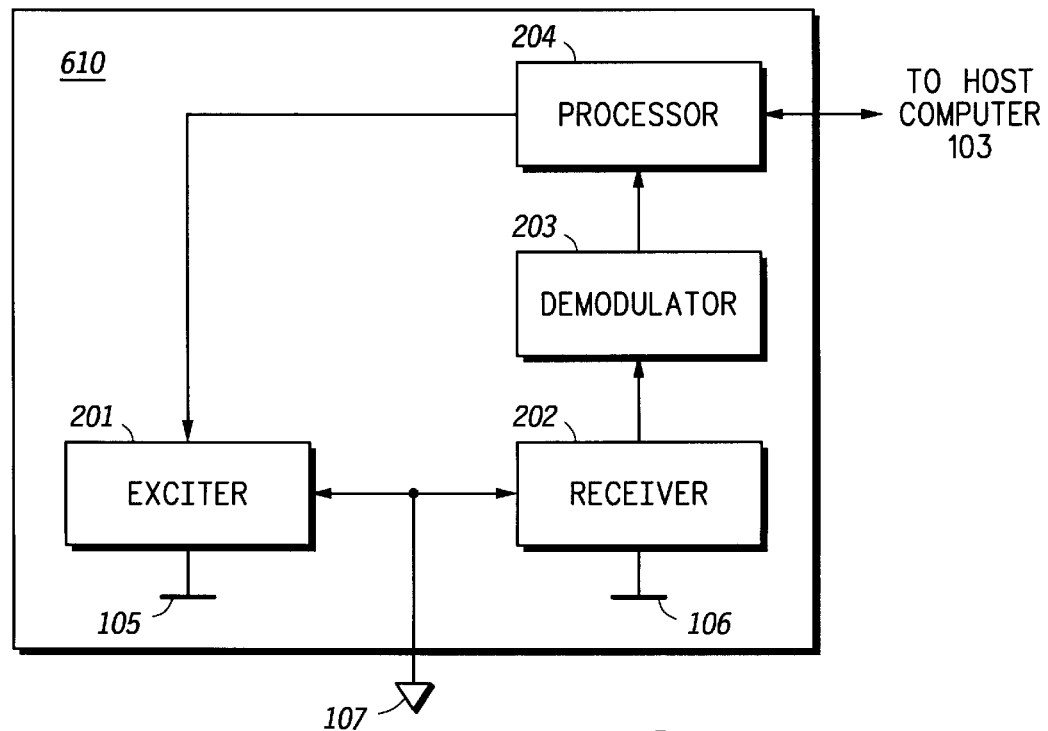
FIG. 2 is a block diagram of an electrostatic reader for the first embodiment of the present invention.

FIG. 2 illustrates a block diagram of the electrostatic reader 101 of the present invention in a monopole electrostatic configuration. The electrostatic reader 101 may be configured in a dipole electrostatic configuration but requires a more complex system with higher transmission energy and a more sensitive receiver than the monopole electrostatic configuration. In a monopole configuration, earth ground is part of the return path. Accordingly exciter 201 and receiver 202 has a connection to earth ground 107 in the monopole configuration. The dipole configuration lends itself to a more portable system but one could easily connect an electrode to a ground reference of some sort thereby having a portable monopole system.

The electrostatic reader 101 includes an exciter 201, a receiver 202, a demodulator 203, a processor 204, electrostatic electrode 105 and electrostatic electrode 106. The processor 204 couples to the host computer 103 over a host interface to bidirectionally transfer information, couples to the exciter 201 to transfer information, and couples to the demodulator 203 to receive information. Exciter 201 couples to the processor 204 to receive information and couples to the electrostatic electrode 105 to transmit signals and information as electrostatic signals. Receiver 202 couples to the electrostatic electrode 106 to receive electrostatic signals and to the demodulator 203 to transfer signals to it. Demodulator 203 couples to the receiver 202 to receive signals and couples to the processor 204 for transferring information.

In general, electrostatic reader 101 generates an electrostatic (electrical) field for use both as a power source for the passive electrostatic transceiver 102 and for transferring information between electrostatic reader 101 and passive electrostatic transceiver 102 or active electrostatic transceiver 104. As such, electrostatic reader 101 electrostatically generates and transmits an excitation signal to the surrounding air, gas, atmosphere or non-electrically conductive medium via the reader's electrostatic electrodes, except for the return path in a monopole system. The excitation signal is an AC signal which activates the passive electrostatic transceiver 102 when it is comes within the capacitance coupling range of reader 101. Upon being sufficiently energized, the passive electrostatic transceiver 102 may respond by electrostatically transmitting a read data signal carrying the information stored in its memory to electrostatic reader 101 (as part of a read operation). Active electrostatic transceiver 104 includes an energy storage means such that it may not require the excitation signal to become sufficiently energized. In accordance to the present invention, reader 101 may also electrostatically couple a write signal to communicate and write information to the passive electrostatic transceiver 102 or active ES transceiver(as part of a write operation). Alternatively, such programming or charging can be carried out by a separate ES programming, ES encoding or electrostatic charger unit (not illustrated). It is to be appreciated that the excitation signal must be generated and transmitted by electrostatic reader 101 to excite the passive electrostatic transceiver 102 or charge the active electrostatic transceiver 104. The excitation signal is an AC energy source and can be a continuous waveform or a varying waveform (i.e. amplitude, frequency, time, etc. of the waveform may vary). Alternatively a user could manually cause the electrostatic reader 101 or a charger to generate the excitation signal to charge or communicate with the passive electrostatic transceiver 102 or active electrostatic transceiver 104 by selecting a button or switch. The reader 101 usually has available a larger power source than the passive electrostatic transceiver 102 or active electrostatic transceiver 104. Thus, the reader 101 has very sensitive receiving and high energy transmission when compared with the passive electrostatic transceiver 102 or active electrostatic transceiver 104.

Figure 3:
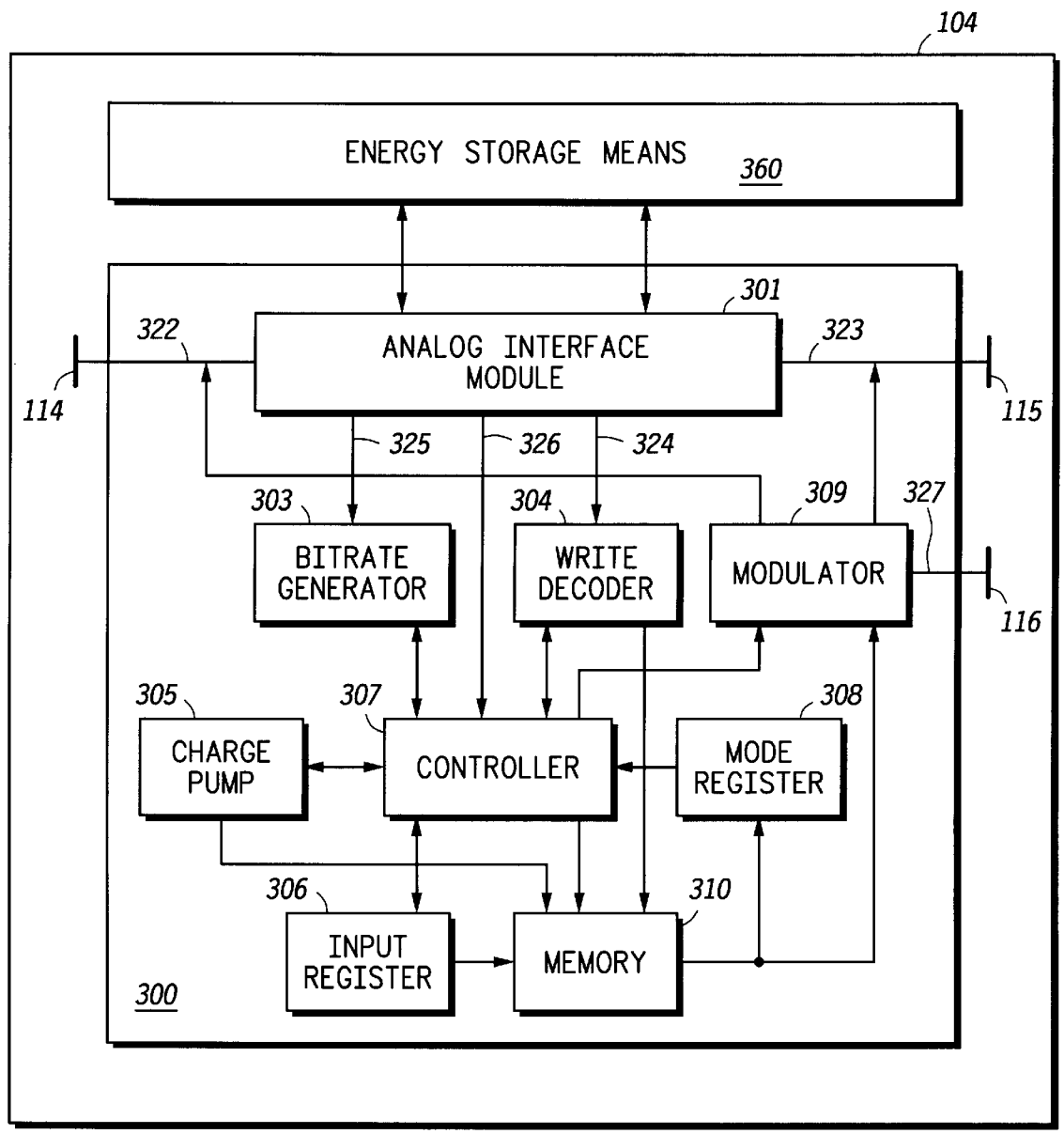
FIG. 3 is a block diagram of an active electrostatic transceiver of the first embodiment of the present invention.

Reference is now made to FIG. 3 illustrating in greater detail the components of a first embodiment of the active electrostatic transceiver 104. As shown in FIG. 3, transceiver 104 may include a circuit 300 having an analog interface module 301, a bitrate generator 303, a write decoder 304, an optional charge pump 305, an input register 306, a controller 307, a mode register 308, a modulator 309, a memory 310, and electrostatic electrodes 114–116. As previously discussed, electrostatic electrodes 114 and 115 receive electrostatic signals from the electrostatic reader 101 and may communicate electrostatic signals back to the electrostatic reader 101. Electrostatic electrode 116 and 115 may also communicate electrostatic signals back to the electrostatic reader 101. Electrostatic electrode 114 and electrostatic electrode 115 are coupled to the analog interface module 301 over the bidirectional signal lines 322 and 333 respectively. The analog interface module 301 couples to the bitrate generator 303 through the clock signal line 325. Analog interface module 301 couples to the controller 307 through the control signal lines 326 and to the write decoder 304 through the data in signal line 324. The modulator 309 couples to the electrostatic electrode 114 and electrostatic electrode 115 by signal lines 322 and 333 respectively. Additionally, the modulator 309 couples to the electrostatic electrode 116 by signal line 327. For optimum electrostatic performance, it is desirable to keep the parasitic capacitance measured between signal lines 322 and 323 as small as possible.

Controller 307 controls the functionality of the transceiver 104 in conjunction with the analog interface module 301. Controller 307 couples to nearly all components of the active electrostatic transceiver 104 except for the electrostatic electrodes and pads. Memory 310 may be a volatile memory requiring a constant supply of energy or a nonvolatile memory such as an EEPROM memory or ferroelectric memory that retains its information when power is no longer supplied. In the case of EEPROM memory, the optional charge pump 305 may be required in order to boost the power supply voltage to write data into the EEPROM memory. Input register 306 temporarily stores information that is to be written into memory 310. It may need to store the information due to a delay in the write cycle caused by the charge pump 305 pumping up or other reasons. In any case, storing data into the input register 306 allows the controller 307 to process other information for the transceiver 104. Mode register 308 reads configuration information for the active electrostatic transceiver 104 from memory 310 and provides this to the controller 307. Write decoder 304 analyzes a data sequence being received by the electrostatic transceiver 104 and determines whether the transceiver should go into a write mode or whether it needs to remain in a receive mode. Modulator 309 prepares data read from memory 310 for communication by the active electrostatic transceiver 104. Modulator 309 can encode and modulate data read from memory 310 in a number of ways for communication with the reader 101.

When in proximity of a reader 101, the active electrostatic transceiver 104 first detects the excitation signal being emitted by an electrostatic reader 101. The excitation signal is generated by reader 101 at a carrier frequency, commonly referred to as a power carrier frequency or exciter frequency. The power carrier frequency, which may be modulated with data, is preferably 125 k Hz. After detecting the excitation signal, the first embodiment of the active electrostatic transceiver 104 goes through a power management sequence and powers up in order to derive a square wave based on the excitation signal at the carrier frequency which is used as a clock signal for the active transceiver. In this manner of generating a clock signal, information received by the active electrostatic transceiver 104 is synchronized with the clock signal. This alleviates generating a clock with a clock oscillator and synchronizing the data and clock using phase-locked loop techniques.

The analog interface module 301 performs multiple functions when receiving and communicating electrostatic signals and charges in an analog signal form. The analog interface module 301 generally performs the electrostatic communication and power management functions for the active electrostatic transceiver 104. Additionally, it performs clock extraction in order to provide a clock to other components of the active electrostatic transceiver 104 including the bitrate generator 303 such that the clock is synchronized with received data. The analog interface module 301 also demodulates a received signal to generate a received data stream. A gap detector (not shown) within the analog interface module 301 analyzes the data stream and determines if a write operation may be involved. If so, it forwards the data sequence signal to the write decoder 304. Write decoder 304 then decodes the data sequence signal to retrieve instruction, data, and address information related to the write operation. If it recognizes the codes as a write command, write decoder 304 signals to so notify controller 307. Write decoder 304 also verifies the validity of the data stream. The decoded instructions and information about the validity of the data stream are provided to controller 307.

Bitrate generator 303 receives as input the clock signal having a carrier frequency (preferably 125 kHz) from a clock extraction circuit (not shown). Bitrate generator 303 generates the data transfer rate at which data is transferred from/to memory 310 during a read or write mode, respectively. Bitrate generator 303 generates the data transfer rate by dividing the carrier frequency (preferably 125 kHz) by a predetermined factor. The data transfer rate is provided to controller 307. In the preferred embodiments, bitrate generator 303 divides by either sixteen or thirty-two such that the data transfer rate can be programmed to be either 125 kHz/16 (7.81 kHz) or 125 kHz/32 (3.91 kHz).

Figure 4A:
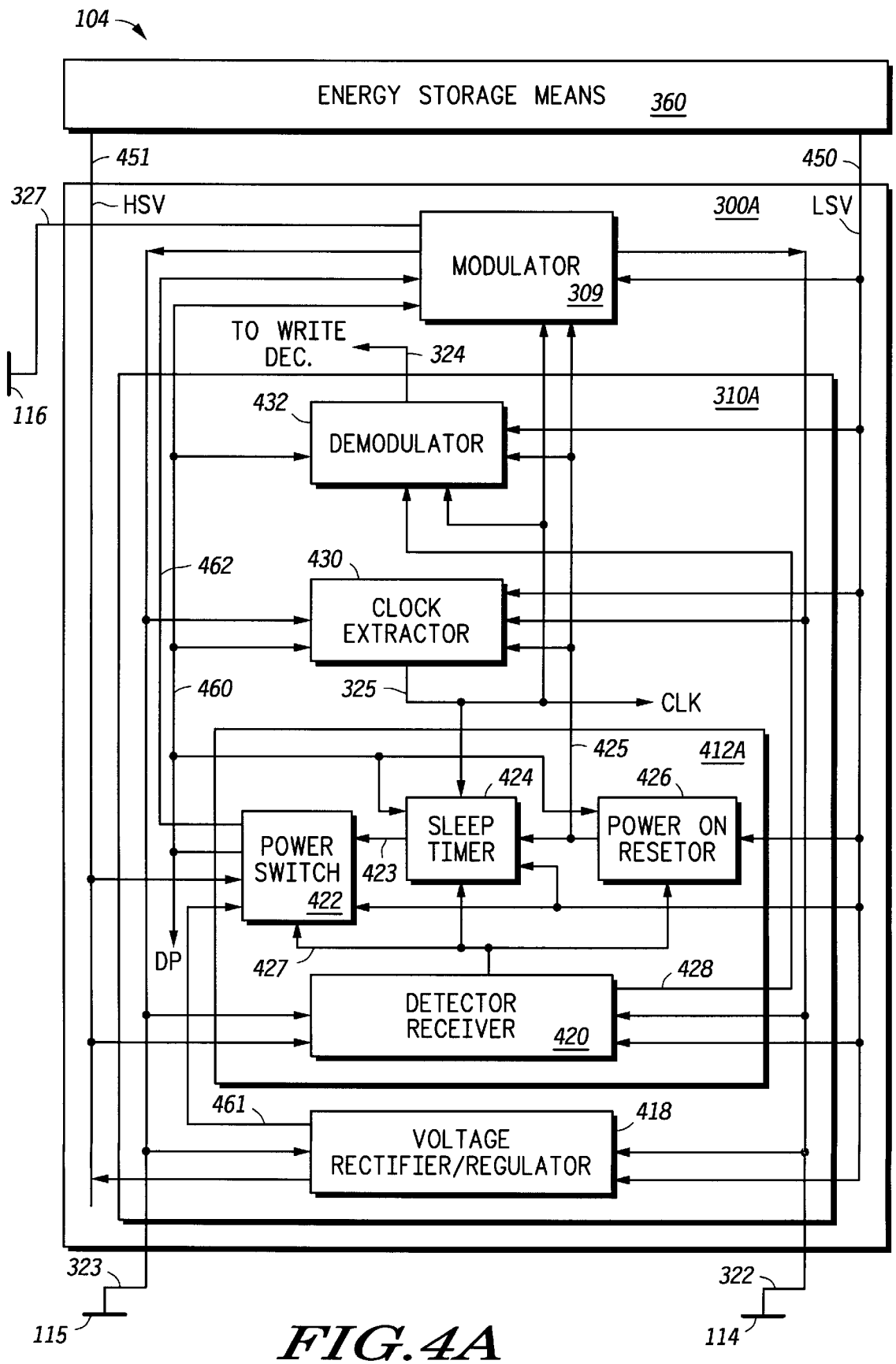
FIG. 4A is a block diagram of the active electrostatic transceiver of FIG. 3 illustrating specific details of the analog interface module block using digital timing elements.

Now referring to FIG. 4A, a detailed block diagram of components of the analog interface module 301 within the active transceiver 104 is illustrated including digital timing elements. The active electrostatic transceiver 104 includes the first electrostatic electrode 114, the second electrostatic electrode 115, the third electrostatic electrode 116, the transceiver circuit 300, and an energy storage means 360. The energy storage means 360 can be any type of energy storage means, including an electrochemical storage cell, such as a rechargeable battery or a non-rechargeable battery, or a capacitor, but is preferably a thin foil battery to conform to a form factor of a smart card, tag, or badge. The transceiver circuit 300A as illustrated in FIG. 4A shows the relevant components in the first embodiment of the present invention. In FIG. 4A, the transceiver circuit 300A is illustrated as including the analog interface module 301 and the modulator 309. In FIG. 4A, the relevant components of the analog interface module 301 include a power manager 412A, a DC voltage rectifier/regulator 418, a clock extractor 430, and a demodulator 432. The power manager 412A includes a detector/receiver 420, a power switch 422, a sleep timer 424, and a power-on-resetor (POR) 426. The DC voltage rectifier/regulator 418 includes a rectifier, a voltage regulator and voltage control functionality such that a DC voltage and energy source may be generated from the excitation signal or other signals received by the active electrostatic transceiver 104 and selectively used to power the transceiver 104 or charge the energy storage means 360. The DC voltage rectifier/regulator 418 couples to the power switch 422 for selection and to the energy storage means 360 for charging.

The detector/receiver 420 in the active electrostatic transceiver 104 may receive power directly from the energy storage means 360 in order to be actively listening for an excitation signal from an electrostatic reader 101. Alternatively, the detector/receiver 420 may have passive components sufficient to detect and receive signals when the energy storage means has insufficient energy to power active components. The detector/receiver 420 may have an amplifier for receiving and amplifying the incoming electrostatic signals, a bandpass filter for filtering unwanted frequencies outside a range of the carrier frequency, and a detector for detecting the presence of the carrier frequency in an excitation signal indicating that the transceiver is within the read range of an electrostatic reader 101. The detector may detect a number of oscillations in the received waveform at the carrier frequency indicating that it is not a noise source generating the waveform. In the preferred embodiment, if the detector detects any signal in the band of the carrier it provides an indication signal. Upon detection of the excitation signal, the detector/receiver 420 generates a wakeup signal on signal line 427 indicating that the active electrostatic transceiver 104 is within range of an electrostatic field and that the active electrostatic transceiver 104 needs to go through its wake up procedure. When outside the range of an electrostatic field, the signal line 427 indicates a go to-sleep signal so that the transceiver may go into a low power sleep state. The wakeup signal 427 is provided to the power on resetor 426, the sleep timer 424, the power switch 422 and clock extractor 430. Upon receiving the wakeup signal 427, power on resetor 426 monitors the device power line 460 to be sure that sufficient power is available to other components within the active electrostatic transceiver 104 before de-asserting a reset signal 425. Once sufficient power is generated in the device power line 460, reset signal 425 is de-asserted and other components may start functioning within the active electrostatic transceiver 104. In FIG. 4A the reset signal line 425 is coupled to the sleep timer 424, the clock extractor 430, the demodulator 432, the modulator 309 and other components of the active electrostatic transceiver 104.

The sleep timer 424 of the active electrostatic transceiver of FIG. 4A is a digital counter that counts to a predetermined count value using the clock signal on clock line 325 received from the clock extractor 430. Upon reaching the predetermined count value, the sleep timer 424 turns off active components within the modulator 309. While the sleep timer 424 is counting a transmit signal is indicated on signal line 423. When the sleep timer 424 reaches the predetermined count value, signal line 423 indicates a receive signal and the active electrostatic transceiver powers off the active components within the modulator 309. While in this mode, the transceiver may still use passive components and the load modulators within the modulator 309 to communicate with a reader. Further, while in this mode, the transceiver may receive and respond to encoded write data transmitted by the reader. The predetermined count value is determined based on the time, in number of clock cycles, that it takes for the active electrostatic transceiver to complete a transmission cycle with an electrostatic reader 101.

Figure 4B:
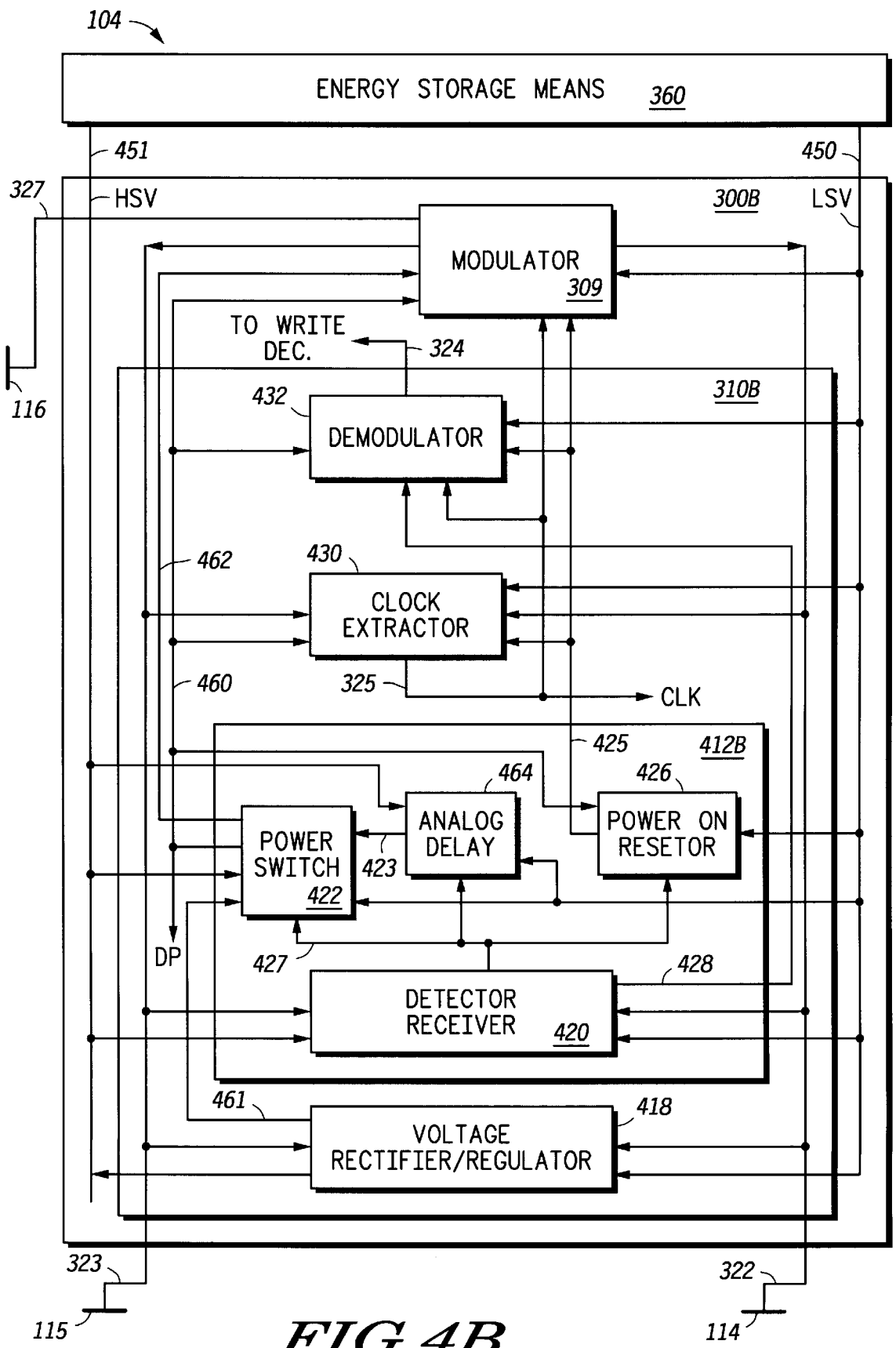
FIG. 4B is a block diagram of the active electrostatic transceiver of FIG. 3 illustrating details of the analog interface module block using analog timing elements.

Referring to FIG. 4B, the power manager 412B includes the detector/receiver 420, the power switch 422, an analog delay block 464, and the power-on-resetor (POR) 426. The digital sleep timer 424 of FIG. 4A is replaced with the analog delay block 464 within the power manager block 412B while other blocks function similar to the description of FIG. 4A. Analog delay block 464 provides an analog delay by using resistor and capacitor elements in conjunction with a threshold detector or comparator. The analog delay block is preferably designed to provide a lengthy delay such as a couple of seconds. The circuitry of the analog delay block is simpler than that of the sleep timer 424. Upon detection of a received signal, the wakeup signal on signal line 427 causes the analog delay block to initiate the RC delay. The transmit signal on signal line 423 is coupled to the power switch 422 and causes it to select power, if available, from the energy storage means 360 for the active transmitter of the modulator 309. Upon completion of the RC delay, a receive signal is indicated on signal line 423 causing the power switch 422 to disconnect power from the active transmitter of the modulator 309.

Figure 4C:
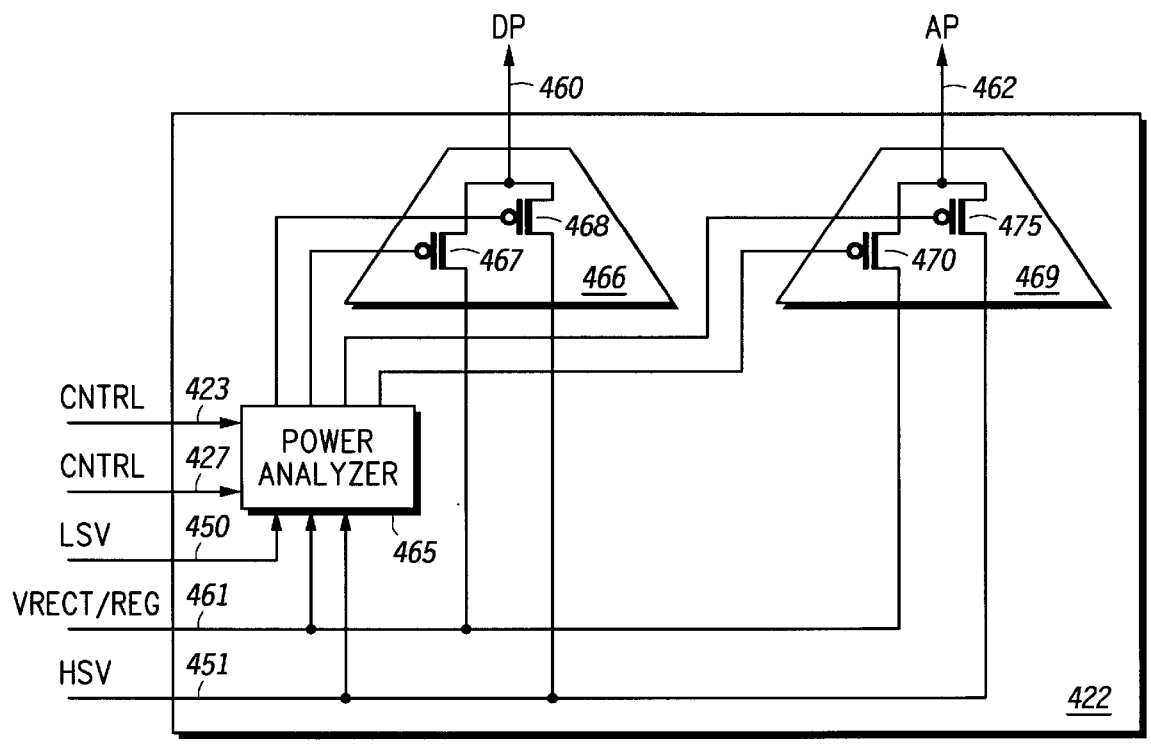
FIG. 4C is a block diagram illustrating components of the power switch block of the analog interface module block.

Power switch 422 is coupled to the detector/receiver 420 through the signal line 427 and to the sleep timer 424 or the analog delay block 464 through the signal line 423. The power switch 422 controls the switching of the high level power supply voltage 451 from the energy storage means 360 or the rectified voltage 461 and provides the analog interface module 301 with the means to manage power consumption. These energy sources may be coupled to the device power line 460 feeding power to other components of the active electrostatic transceiver 104. FIG. 4C illustrates the basic components of the power switch 422 that provide power selection for the active electrostatic transceiver 104. These components include the power analyzer 465, the multiplexor 466 and the multiplexor 469. Multiplexor 469 may optionally be a switch with one end connected to the amplifier power line 462 and another end connected to the device power line 460. Power analyzer 465 performs an analysis on the energy provided by the DC voltage rectifier/regulator 418 with that supplied by the energy storage means 360. The power analyzer 465 receives the rectified voltage 461, the high level supply voltage 451 and the low level supply voltage 450 in order to perform the analysis. Additionally, control signals 423, 427 and any other control signals are received by the power analyzer 465 to further control the multiplexor 466 and multiplexor 469. Signal lines 423 and 427 are exemplary control signals input into the power analyzer 465. Typically, if the energy storage means 360 has higher energy levels it is selectively coupled to the device power line 460 and the amplifier power line 462 when signal line 427 indicates a transmit signal. Optionally when the transceiver 104 is in an active mode for active transmission by amplifier 477 and when signal line 427 indicates a receive signal, the energy storage means may be selectively decoupled from the amplifier power line 462, have the rectified voltage 461 coupled to the amplifier power line 462 or alternatively have no power source coupled to the amplifier power line 462 powering OFF the circuitry of amplifier 477 in each case conserving power in the energy storage means. If it is the case that the energy storage means 360 has lower energy levels than that of the rectified voltage 461, the rectified voltage may be selectively coupled to the device power line 460 by multiplexor 466 and to the amplifier power line 462 by multiplexor 469 such that the load modulator 473 and the amplifier 477 can perform passive load modulation and passive transmission of electrostatic signals in a passive mode. Additionally if it is desirable to conserve power or more efficiently charge the energy storage means, multiplexor 466 or 469 can operate as switches decoupling the device power line 460 or the amplifier power line 462 from any power source. After selecting a power source where the power switch 422 couples the high level power supply 451 or the rectified voltage 461 with the device power line 460, circuitry within the active electrostatic transceiver goes into a power on reset sequence controlled by the power on resetor 426. When out of the power on reset sequence, the active electrostatic transceiver 104 can go through a communication cycle with the electrostatic reader 101 while in the read range and the sleep timer 424 starts counting or the analog delay cycle of the analog delay block 464 begins. If the active electrostatic transceiver remains in the electrostatic field (i.e. read range) and the sleep timer 424 reaches its predetermined count value or the analog delay block completes the predetermined RC delay time, a receive signal is indicated on signal line 423 to the power switch 422. The active electrostatic transceiver 104 continues to listen for signals from reader 101 or other sources that communicate on the carrier frequency. If the active electrostatic transceiver 104 is removed from the electrostatic field, the detector/receiver 420 resets and a sleep signal is indicated on signal line 427. Upon receiving the sleep signal, the power switch 422 selectively disconnects the high level voltage supply 451 from the device power line 460 so that components coupled to the device power line 460 become powered off and enter the sleep mode. In this manner when the active electrostatic transceiver 104 is outside the electrostatic field (i.e. read range) it goes into its low power sleep mode.

Clock extractor 430 is coupled to the energy storage means 360 through the high level power supply 451 and the low level power supply 450, the detector/receiver 420 through signal line 428, and the power on resetor 426 through signal line 425. Clock extractor 430 derives a square wave based on the excitation signal at the carrier frequency which is used as a clock signal for the active transceiver. In this manner of generating a clock signal, transmitted information received by the active electrostatic transceiver 104 is synchronized with the clock signal. This alleviates generating a clock with a clock oscillator and synchronizing the data and clock using phase-locked loop techniques. The clock extractor 430 is directly coupled to the energy storage means 360 but can be put into a low power sleep mode by a sleep signal on the signal line 427 when the active electrostatic transceiver is out of the electrostatic field or read range. While an electrostatic field is detected by the detector/receiver 420, the clock extractor 430 continues to function and generate a square wave clock so that electrostatic signals may be continuously received while in an electrostatic field.

Demodulator 432 is coupled to the power switch 422 through the device power line 460, the energy storage means through the low level power supply 450, the detector/receiver 420 through signal line 428, power on resetor 426 through signal line 425, clock extractor 430 through clock signal line 325, and write decoder 304 through signal line 324. The demodulator converts an analog signal received from the detector/receiver 420 and converts it into a digital waveform. It then extracts transmitted information from this digital waveform by using the clock signal on the clock signal line 325, because data on the digital waveform is synchronized with the extracted clock signal. Knowing that data is aligned with the clock allows one to simply sample a data waveform after a predetermined time from a clock rise or fall transition. The digital waveform may have been encoded with NRZ, Manchester, or some other encoding and is additionally decoded by the demodulator 432 into the digital information that may have been transmitted by the electrostatic reader 101. Demodulator 432 receives its power from the device power line 460 and so it may be put into a low power sleep mode when the power switch disconnects the high level voltage supply 451 from the device power line 460.

Modulator 309 is coupled to the power switch 422 through the device power line 460, the energy storage means 360 through the low level power supply 450, the electrostatic electrodes 114–116 respectively through signal lines 322, 323 and 327, power on resetor 426 through signal line 425, and the clock extractor 430 through clock signal line 325. Modulator 309 includes a load modulator for electrostatic electrodes 114–115 and an active power amplifier in order to amplify signals for the extra transmission distance to the reader over the electrostatic electrode 116. A passive electrostatic transceiver may not function properly at large read ranges because of weak signals. The electrostatic reader's receiver may require increased sensitivity in order to receive signals from large read ranges.

Figure 4D:
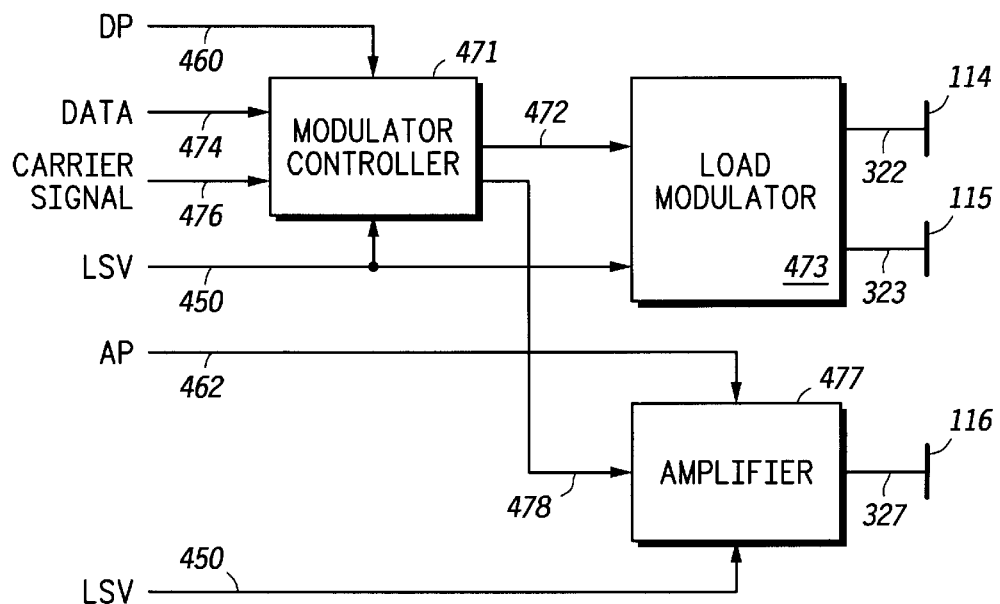
FIG. 4D is a block diagram of components of the modulator block within the active electrostatic transceiver of FIG. 3.
Figure 4E:
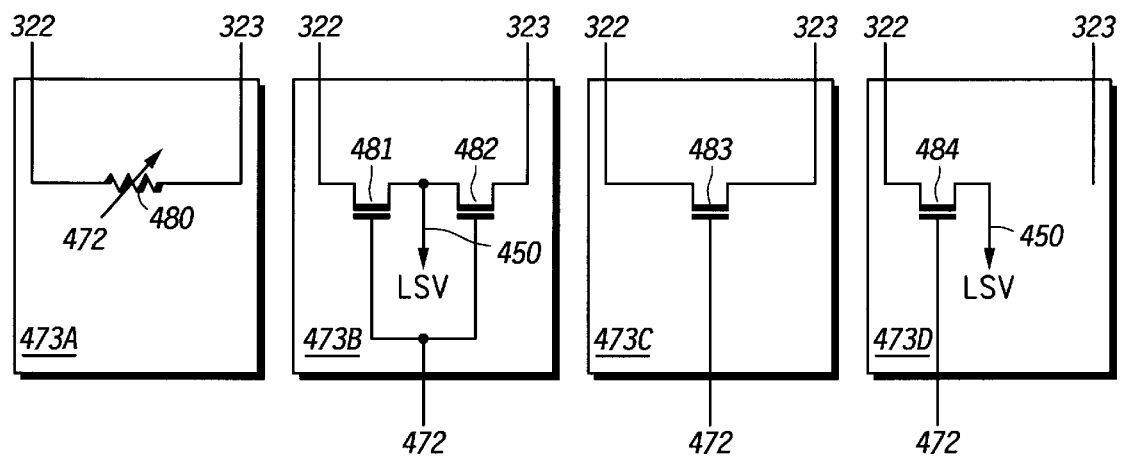
FIG. 4E are schematic diagrams of load modulation circuitry of the load modulator.

Referring now to FIG. 4D, a block diagram is illustrated of the components within the modulator 309 for active and passive load modulation and active transmission. Active and passive load modulation are accomplished by the modulator controller and the load modulator. Active load modulation occurs when the energy storage means 360 is coupled to the device power line 460 and the circuitry of the modulator controller 471. Passive load modulation occurs when the DC voltage rectifier/regulator within the transceiver 104 provides the rectified voltage and is coupled through the power switch to the device power line 460 and the modulator controller 471. Load modulation is accomplished by varying the impedance between the electrostatic electrodes 114 and 115. Varying the impedance between the electrostatic electrodes, that are capacitively coupled with the electrostatic electrodes of the reader 101, causes the excitation signal generated by the reader 101 to be reflected back. A data signal and a carrier signal is input into the modulator controller 471 at line 474 and 476 respectively to control the load modulator 473. The carrier signal 476 is commonly referred to as the data carrier and has a carrier frequency. Preferably the carrier frequency of the data carrier is 62.5 K Hz or one-half the power carrier frequency. FIG. 4E illustrates a few load modulators 473A–473D. Load modulator 473A consists of a variable impedance 480 coupled between the electrostatic electrodes 114 and 115 that has its impedance varied or switched by control signal 472 from the modulator controller 471. Load modulator 473B includes transistors 481 and 482, each coupled respectively between an electrostatic electrode and the low level supply voltage 450. The transistors are preferably turned ON and OFF by having their gates switched by a digital drive signal supplied on control signal 472. Load modulator 473C includes transistor 483 coupled between the electrostatic electrodes 114 and 115. Transistor 483 is preferably turned ON and OFF by having its gate switched by a digital drive signal supplied on control signal 472. Load modulator 473D includes transistor 484 coupled between one electrostatic electrode 322 and the low level supply voltage 450. This is an asymmetrical load modulation technique where circuitry within a rectifier provides the return path through the opposite electrostatic electrode 323. Referring back to FIG. 4D, active and passive transmission is accomplished by the modulator controller 471 and amplifier 477. Amplifier 477 is preferably a CMOS fully complementary inverter or buffer with its VDD input connected to the amplifier power line 462 and its VSS connection coupled to the low level power supply 450. Active transmission occurs when power is coupled from the high level power supply 451 through the power switch and onto the amplifier power line 462 by multiplexor 469. Passive transmission occurs when the DC voltage rectifier/regulator 418 within the transceiver 104 provides the rectified voltage and is coupled through the power switch to the amplifier power line 462 by multiplexor 469. Multiplexor 469 and 466 can further operate as a switch to selectively turn power OFF to circuitry connected to the device power line 460 or the amplifier power line 462 by turning OFF both of the transistor switches 467–468 or 470 and 475. Data 474 input into the modulator controller 471 is modulated with the input carrier signal 476 to generate the data signal on line 478. Signal line 478 is separate from signal line 472 such that the load modulator 473 and the amplifier 477 can be enabled or disabled independent from one another. Disabling the load modulator 473 or the amplifier 477 may be performed by setting the signal on line 472 or 478 respectively to a high or low DC logic level. The signal on signal line 478 is input into the amplifier 477. The amplifier 477 amplifies the signal on line 478 and transmits the information electrostatically over the electrostatic electrode 116. In active mode, after the transmit time has occurred, the power to the amplifier 477 may be turned OFF to conserve power.

Figure 5:
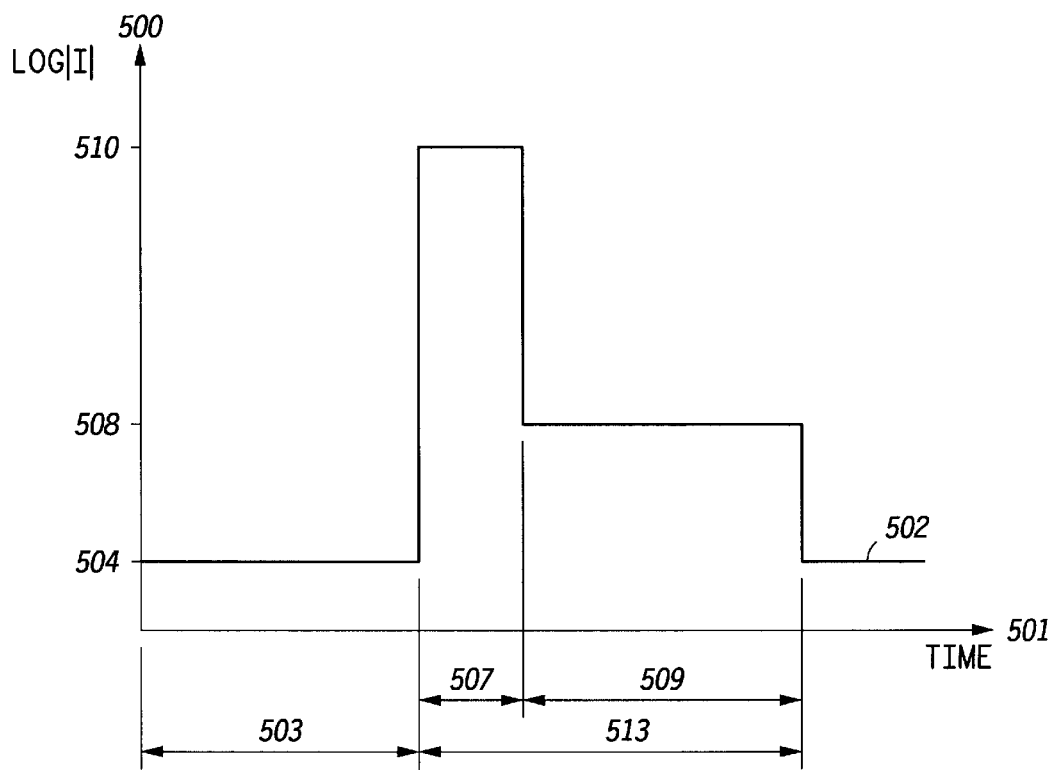
FIG. 5 is a waveform diagram illustrating current consumption within the active electrostatic transceiver for various functional operations.

Now referring to FIG. 5, a waveform diagram illustrates the exemplary current consumption for the active electrostatic transceiver 104 in various power managed levels. In FIG. 5 the logarithm of current consumption 500 is plotted against time 501. The idealized waveform 502 illustrates the current consumption from the energy storage means 360 during various operating conditions and states of the active electrostatic transceiver 104. In an out of range or out of electrostatic field state during time 503, the active electrostatic transceiver is in a sleep state which is its lowest current consumption state at current level 504. In this condition nearly all circuitry in the active transceiver 104 is turned off except for the detector/receiver 420. In sleep mode, the current consumption of current level 504 is preferably on the order of eight hundred nanoamps. When in the read range or the range of the electrostatic field during time 513, the current consumption level is at least at level 508 which is at all times greater than the out of read range mode illustrated during time 503. During a communication cycle of transmission and reception by the active electrostatic transceiver, such as time 513, the current consumption is relatively large compared to the sleep mode when outside of the read range. During periods of transmission, such as time 507, current consumption is at its highest level 510. During the receive time period, such as time 509, current consumption is at level 508 which is less than that of the transmission current consumption level 510. Time period 507 is exemplary of the predetermined count value for the sleep timer 424 or the RC delay time of the analog delay block 464. After performing a transmission phase during time 507, the active electrostatic transceiver goes into a receive phase during time 509. If transceiver is closely coupled to reader, transceiver data can be detected by reader when the active transceiver is passively load modulating.

Figure 6A:
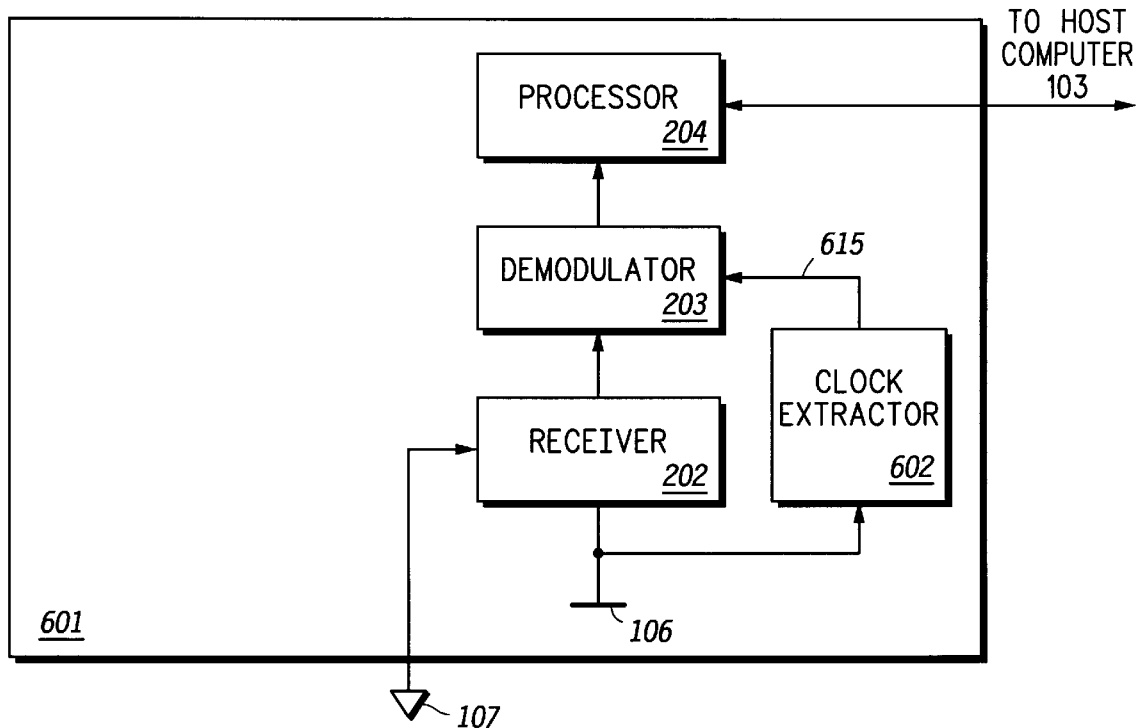
FIG. 6A is a block diagram of an electrostatic reader for supporting manual activation of an active electrostatic transceiver.
Figure 6B:
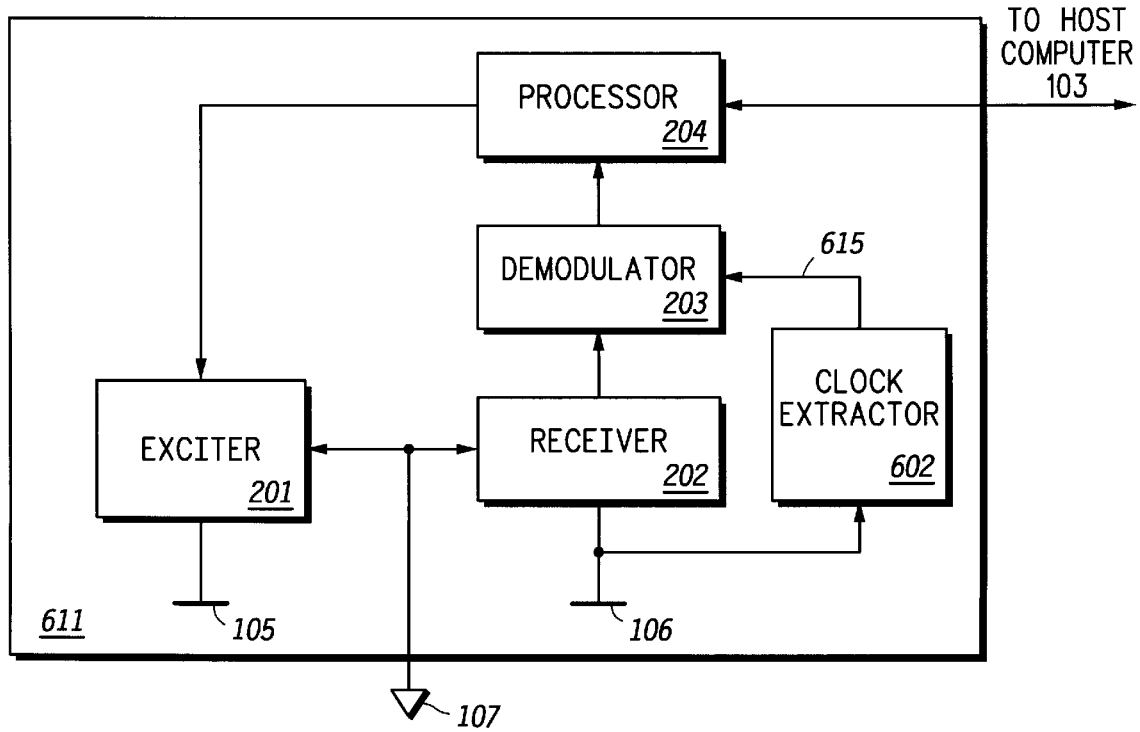
FIG. 6B is a block diagram of an electrostatic reader for supporting automatic detection and activation of an active electrostatic transceiver.

Now referring to FIG. 6A illustrating a block diagram of electrostatic reader 601 for supporting manual activation of an active electrostatic transceiver. Electrostatic reader 601 is in a single electrode configuration and includes electrostatic electrode 106, receiver 202, demodulator 203, processor 204, and a clock extractor 602. The exciter is absent from electrostatic reader 601 because it is not required for the manual mode of operation for the active electrostatic transceiver. Because the exciter is absent, noise that otherwise might be generated by the exciter and injected into the receiver 602 is not present. Furthermore, the electrostatic reader 601 generates less EMC radiation and may be employed in applications where radiation is of concern. The clock extractor 602 is coupled to the electrostatic electrode 106 in order to extract a clock signal 615 from the received ES signal. The clock signal 615 is provided to the demodulator 203 for data demodulation. Like numbered components of the electrostatic reader 601 operate similar to the components of electrostatic reader 101. Refer now to FIG. 6B, illustrating a block diagram of an electrostatic reader 611 for supporting automatic detection and activation of an active electrostatic transceiver. Electrostatic reader 611 is in a monopole configuration and includes electrostatic electrode 105, electrostatic electrode 106, exciter 201, receiver 202, demodulator 203, processor 204, and clock extractor 602. The exciter 201 provides for the automatic detection and activation of an active electrostatic transceiver. Like numbered components of the electrostatic reader 611 operate similar to the components of electrostatic reader 101.

Figure 7:
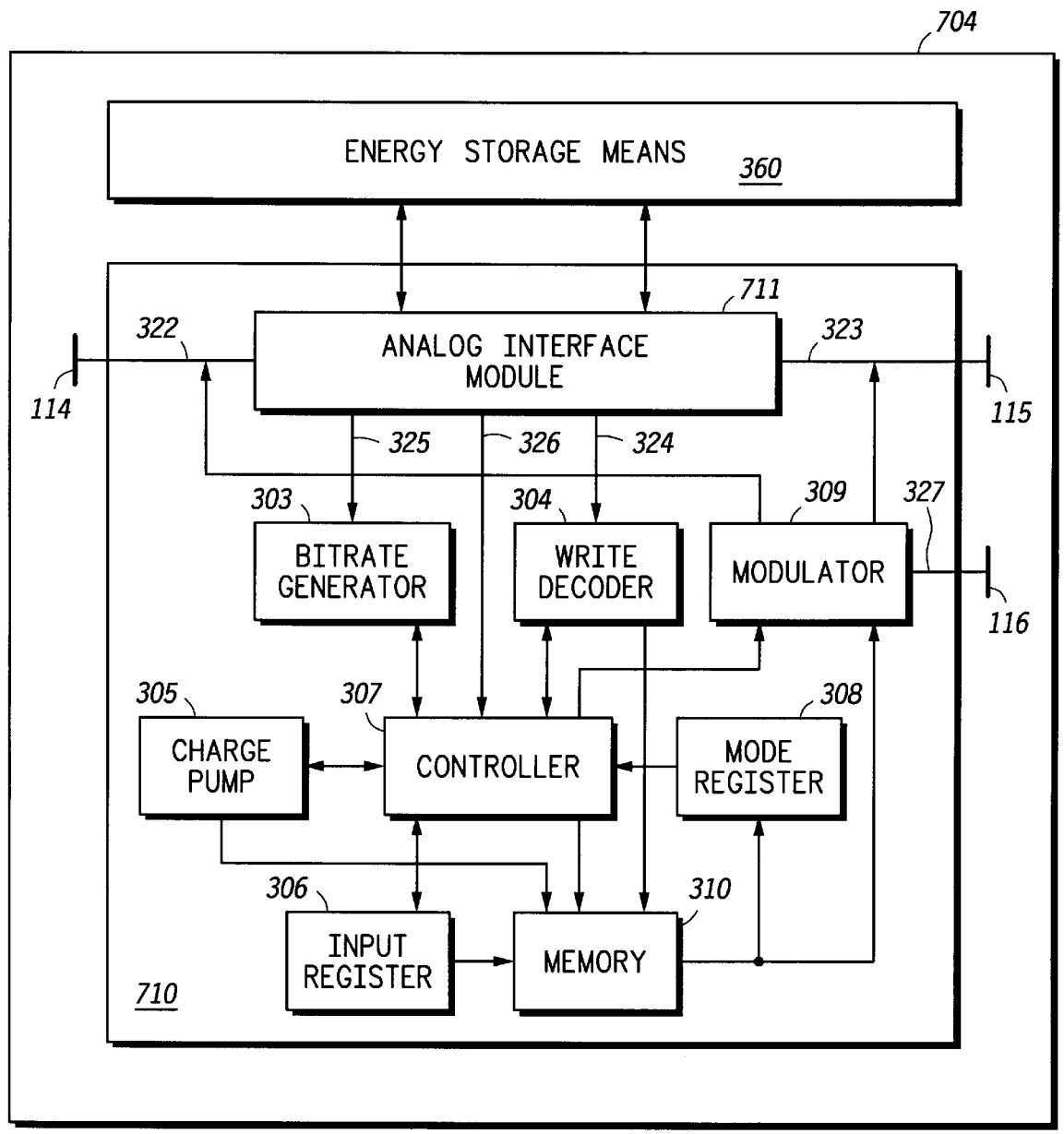
FIG. 7 is a block diagram of an active electrostatic transceiver for a second embodiment of the present invention.

Now referring to FIG. 7 illustrating a block diagram of an active electrostatic transceiver 704 for the second embodiment of the present invention. Except for the analog interface module 711 in circuit 710, the components of the active electrostatic transceiver 704 operate similar to the similarly numbered components of active electrostatic transceiver 104. Because electrostatic reader 601 does not generate an excitation signal, active electrostatic transceiver 704 operates asynchronously with respect to the electrostatic reader 601 and needs to generate its own internal clock. Electrostatic reader 611 of FIG. 6B generates an excitation signal which can be used by the active ES transceiver to extract a clock signal for demodulation of any received signals.

The analog interface module 711 generally performs the power management function for the active electrostatic transceiver 704. Additionally, it generates its own clock from a free running low power clock oscillator. This generated clock is provided to other components of the active electrostatic transceiver 704 which require a clock including the bitrate generator 303. The analog interface module 711 also demodulates the received signal to generate a received data stream. The analog interface module 711 also analyzes the received data stream in order to determine if the active electrostatic transceiver 704 should perform some operation such as a read operation or a write operation and communicates the results of the analysis to the controller 307 and the write decoder 304. It preferably performs this analysis by searching for predetermined gaps in the received data stream. Modulator 309 as previously described in detail communicates information from the active electrostatic transceiver to a reader.

Figure 8A:
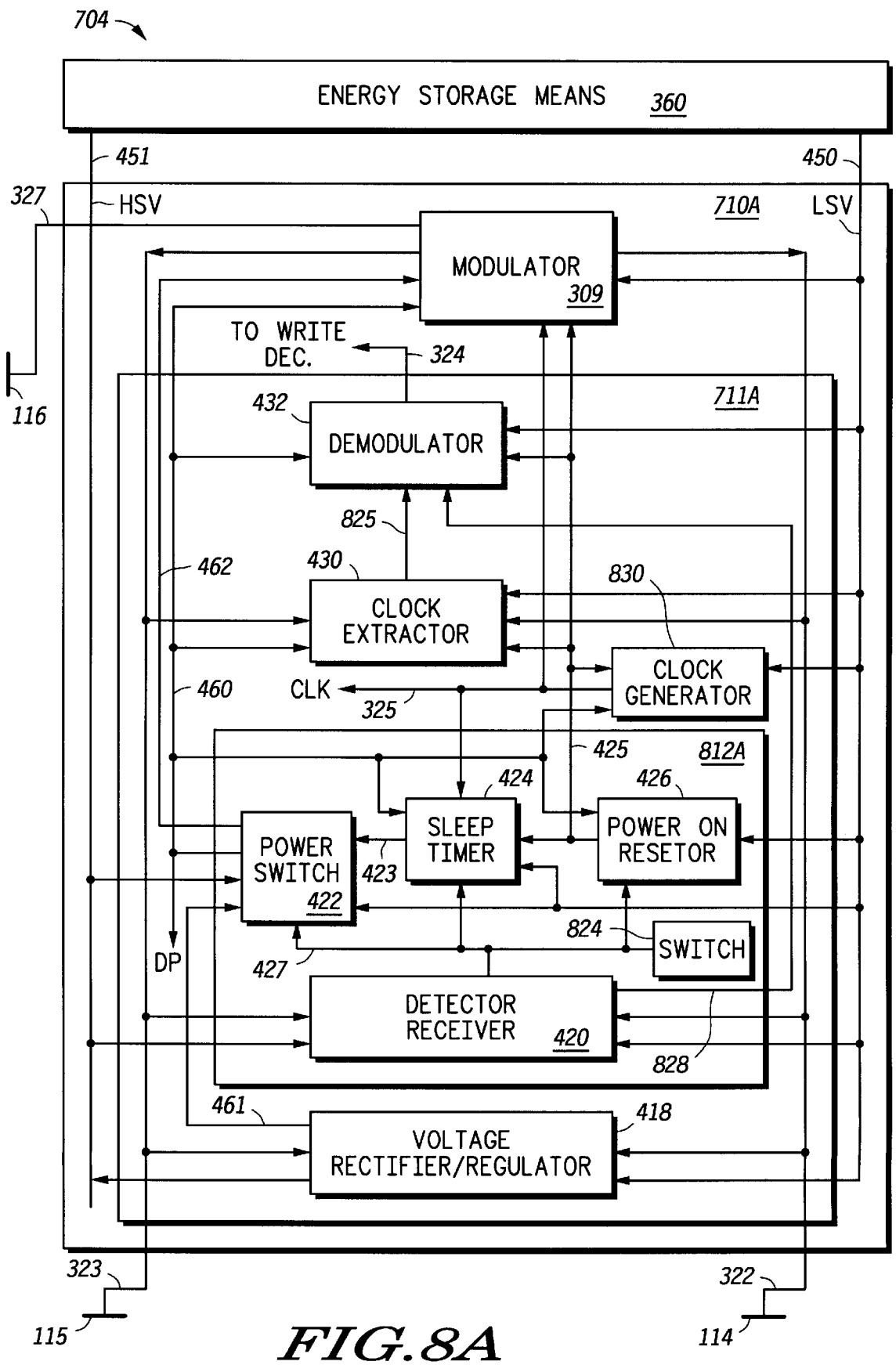
FIG. 8A is a block diagram of the active electrostatic transceiver of FIG. 7 illustrating details of the analog interface module block using digital timing elements.

Now referring to FIG. 8A, selected details of the analog interface module 711 within the active electrostatic transceiver 704 are illustrated. The active electrostatic transceiver 704 includes the first electrostatic electrode 114, the second electrostatic electrode 115, the third electrostatic electrode 116, the transceiver circuit 710, and an energy storage means 360. The energy storage means 360 can be any type of energy storage means, including a battery or capacitor, preferably it is a thin foil battery to conform to a form factor for a smart card, tag, or badge. The transceiver circuit 710 as illustrated in FIG. 8A shows the relevant components for the second embodiment of the present invention. In FIG. 8A, the transceiver circuit 710 includes the analog interface module 711 and modulator 309. Components of the analog interface module 711 include a DC voltage rectifier/regulator 418, a power manager 812A, a clock extractor 430, a clock generator 830, a demodulator 432, and a modulator 309. The power manager 812A includes a detector/receiver 420, a power switch 422, a sleep timer 424, a power-on-resetor (POR) 426, and a manual switch 824. Except as otherwise described below, like numbered components of the transceiver circuit 710 operate similar to the similarly numbered components of the transceiver circuit 300 of the active electrostatic transceiver 104.

In the second embodiment of the present invention the active electrostatic transceiver 704 may not receive an excitation signal from which to extract a clock signal, particularly when coupled to the reader 601 of FIG. 6A. Thus, the transceiver circuit 710 includes its own clock generator 830. A clock extractor 430 is retained to generate an extracted clock 825 for demodulation of signals that may be received from readers other than reader 601. Clock generator 830 receives power by coupling to the device power line 460 and the low level power supply 450. Clock generator 830 has its own low power clock oscillator in order to generate a clock. The clock signal on clock line 325 is provided to the sleep timer 424 amongst other components of the transceiver circuit 710.

The manual switch 824 is for manually activating the active ES transceiver 704 when operating with the reader 601 of FIG. 6A. The manual switch 824 can generate a wakeup signal on signal line 427 when it is manually selected. The detector/receiver 420 is available in the active ES transceiver 740 although it may not be used with reader 601 of FIG. 6A or powered ON until the manual switch 824 manually activates the active ES transceiver 704. The detector/receiver 420 can automatically activate the active ES transceiver 704 when coupling to reader 611 of FIG. 6B if an ES excitation field is detected at the proper carrier frequency. Upon detection, the wakeup signal is provided on signal line 427. No matter how it is generated, the wakeup signal causes the transceiver circuit 710 to come out of a sleep mode and go into a power up mode similarly described above.

Figure 8B:
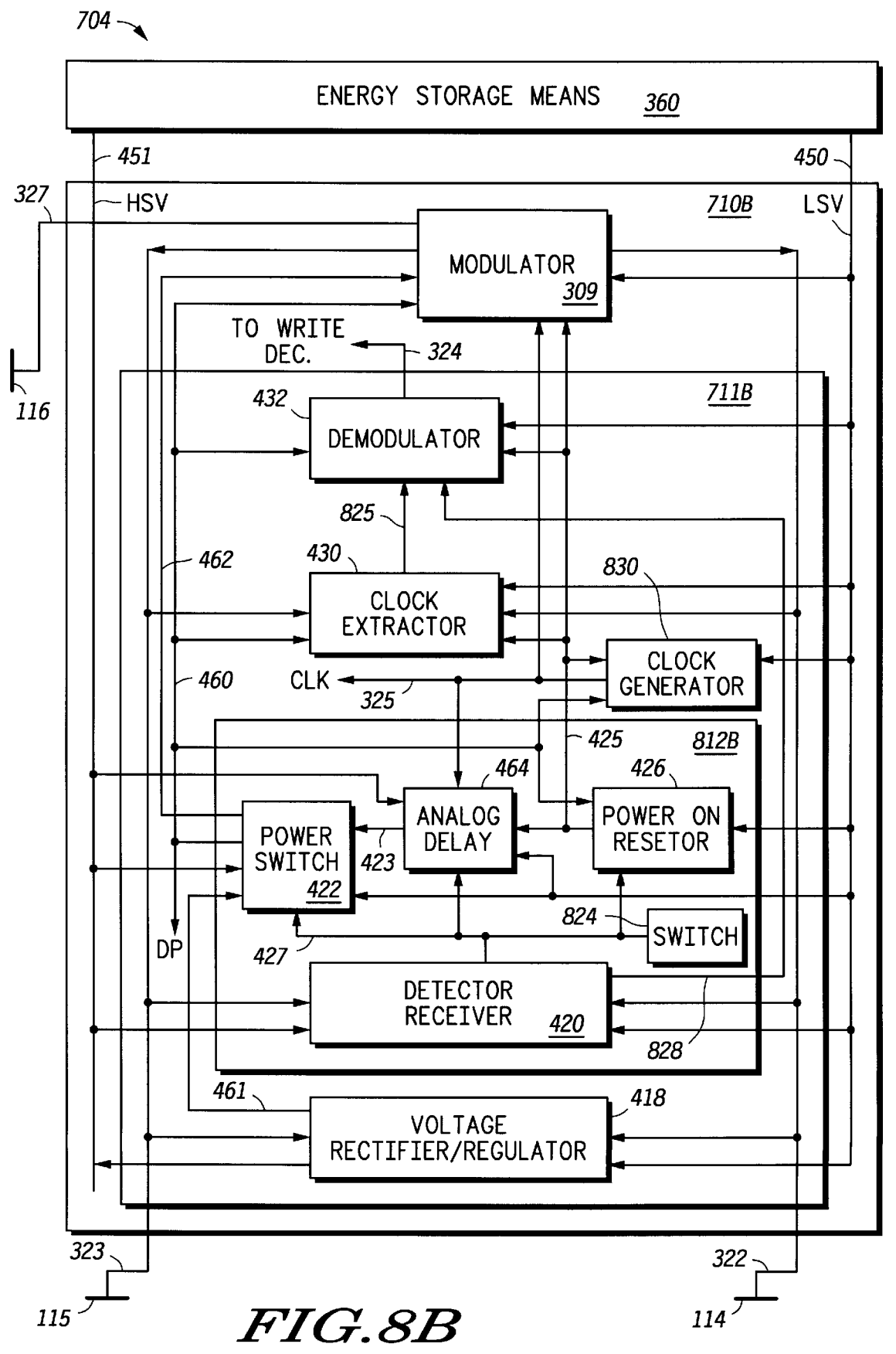

The sleep timer 424 of the transceiver circuit 710 operates as previously described with respect to transceiver circuit 300A. Referring to FIG. 8B, the sleep timer 424 is replaced by an analog delay block 464. The analog delay block 464 of the transceiver circuit 710 operates as previously described with respect to transceiver circuit 300B of FIG. 4B. Clock generator is coupled to the device power line 460. Until the proper amount of voltage required by the power on resetor 426 is generated, clock generator 830 is in a quiescent state.

Power on resetor 426 monitors the device power line 460 to be sure that sufficient power is available to other components within the active electrostatic transceiver 704 before de-asserting a reset signal 425. Once sufficient power is generated in the device power line 460, reset signal 425 is de-asserted and other components may start functioning within the active electrostatic transceiver 704. In FIG. 8A the reset signal line 425 is coupled to the sleep timer 424, the demodulator 432, the modulator 309 and other components of the active electrostatic transceiver 704. In FIG. 8B, the reset signal line 425 is coupled to the analog delay block 464, the demodulator 432, the modulator 309 and other components of the active electrostatic transceiver 704.

While the preferred embodiment of the active electrostatic transceiver 104 and 704 have been described, it can be appreciated that other active electrostatic RFID transceivers may be encompassed by the present invention.

The present invention has many advantages over the prior art. The present invention provides a larger read range over passive RFID communication systems and therefore increases the applicability of electrostatic communication systems. Additionally, the present invention provides for greater flexibility in choosing components for an electrostatic transceiver. Also, the present invention provides greater operational functionality in an electrostatic transceiver because the available power is greater. Furthermore, the present invention provides for greater integration in circuitry and reduces the amount space utilized for an active electrostatic transceiver. Additionally the present invention in its second embodiment reduces the interference and noise in an electrostatic communication system so that it may be used in environments requiring low noise emission. The present invention provides for lower cost RFID transceivers such that disposable applications are possible. Furthermore, the present invention provides the capability to operate an active electrostatic transceiver in an active mode operating under the power of an energy storage means or in a passive mode under the power generated by a voltage rectifier/regulator when the energy storage means power is too low or if in the case of a desirable low-power operational mode.

The preferred embodiments of the present invention is thus described. While the present invention has been described in particular embodiments, the present invention should not be construed as limited by such embodiments, but rather construed according to the claims that follow below.

We claim:

1. A transceiver, comprising:
    a first electrostatic electrode;
    a second electrostatic electrode;
    an energy storage device; and
    a transceiver circuit coupled to the first electrostatic electrode, the second electrostatic electrode, and the energy storage device, the transceiver circuit comprising:
        a power switch, for selectively coupling and decoupling the energy storage device from components within The transceiver circuit; and
        a detector for detecting an excitation signal and issuing a signal to the power switch in response to receipt of the excitation signal whereby the power switch selectively couples the energy storage device to components within the transceiver circuit responsive to the signal.

2. The transceiver of claim 1, wherein the transceiver circuit further comprises:
    a counter coupled to the power switch.

3. The transceiver of claim 2, wherein the transceiver circuit further comprises:
    a clock generator coupled to the counter and the power switch.

4. The transceiver of claim 1, wherein the transceiver circuit further comprises:
    a power on resetor coupled to the detector and the power switch.

5. The transceiver of claim 4, wherein the transceiver circuit further comprises:
    a clock extactor coupled to the detector and the power on resetor.

6. The transceiver of claim 5, further comprises:
    a demodulator coupled to the clock extractor, the power switch, the power on resetor, and the detector.

7. The transceiver of claim 1, wherein the transceiver circuit further comprises:
    an analog delay coupled to the power switch.

8. The transceiver of claim 1, further comprises:
    a controller coupled to the transceiver circuit;
    a memory coupled to the controller; and
    a modulator coupled to the controller, the memory, the first electrostatic electrode, and the second electrostatic electrode.

9. The transceiver of claim 8, further comprises a third electrostatic electrode coupled to the modulator, and the modulator further comprises:
    an amplifier coupled to the third electrostatic electrode.

10. The transceiver of claim 1, wherein the detector further comprises:
    an amplifier; and
    a filter.

11. The transceiver of claim 1, wherein the energy storage device is selected from a group consisting of: a battery, a capacitor, and a electrochemical storage cell.

12. The transceiver of claim 1, further comprises:
    a switch for manually issuing a wakeup signal to the power switch to selectively couple the energy storage device to components within the transceiver circuit.

13. An transceiver, comprising:
    a first electrostatic electrode;
    a second electrostatic electrode;
    an energy storage device having a first enery level; and
    a transceiver circuit coupled to the first electrostatic electrode, the second electrostatic electrode, and the energy storage device, the transceiver circuit comprising:
        a rectifier for generating energy, having a second energy level, from electrostatic signals received by at least one of the first and second electrostatic electrodes; and
        a power manager, coupled to the rectifier and the energy storage device, for analyzing the first energy level and the second energy level, and for selectively coupling the rectifier to circuitry of the transceiver circuit when the second energy level is greater than the first energy level, whereby the circuitry of the transceiver is functional from the energy generated from the rectifier.

14. The transceiver of claim 13, further comprising a modulator coupled to the transceiver circuit, wherein the modulator comprises:
    a load modulator coupled to the first electrostatic electrode and the second electrostatic electrode; and
    an amplifier coupled to a memory and a third electrostatic electrode.

15. The transceiver of claim 14, wherein
    the power manager selectively couples the rectifier to the modulator when the energy stored within the energy storage device is insufficient to power the modulator, whereby electrostatic signals may be communicated by the modulator.

16. The transceiver of claim 14, wherein the power manager selectively couples the energy storage device to the modulator to power the amplifier and transmit electrostatic signals through the third electrostatic electrode when the energy stored within the energy storage device is sufficient to power the amplifier, whereby electrostatic signals may be transmitted by the modulator.

17. The transceiver of claim 14, wherein
    the power manager selectively couples the energy storage device to the modulator to power the load modulator and communicate electrostatic signals through at least one of the first electrostatic electrode and the second electrostatic electrode when the energy stored within the energy storage device is sufficient to power the load modulator, whereby electrostatic signals may be communicated by the modulator.

18. The transceiver of claim 14, wherein
    the power manager selectively couples the rectifier to the modulator to power the load modulator and communicate electrostatic signals through at least one of the first electrostatic electrode and the second electrostatic electrode when the energy stored within the energy storage device is insufficient to power the load modulator, whereby electrostatic signals may be communicated by the modulator.

19. The transceiver of claim 14, wherein the power manager further comprises:

a multiplexor for selectively coupling the rectifier or the energy storage device to the load modulator, and a switch for selectively coupling the energy storage device to the amplifier.

20. The transceiver of claim 14 wherein the power manager selectively couples the rectifier to the modulator.

21. The transceiver of claim 13, further comprises:

a power switch, for selectively coupling and decoupling the energy storage device from components within the transceiver circuit; and a counter coupled to the power switch.

22. The transceiver of claim 21, further comprises:

a switch for manually issuing a wakeup signal to cause the power switch to selectively couple the energy storage device to components within the transceiver circuit.

23. The transceiver of claim 13, further comprises:

a modulator coupled to the first and second electrostatic electrodes; and a clock generator coupled to counter and the modulator.

24. The transceiver of claim 13, further comprises:

a counter.

25. The transceiver of claim 24, further comprises:

a power on resetor coupled to the counter, for asserting a reset signal during the coupling of the energy storage device to components within the transceiver circuit and de-asserting the reset signal after sufficient power is coupled to components within the transceiver circuit.

26. The transceiver of claim 25, further comprises:

a clock extractor coupled to the counter and the power on resetor.

27. The transceiver of claim 25, further comprises:

a demodulator coupled to the clock extractor and the power on resetor.

28. The transceiver of claim 13, further comprises:

a memory;

a modulator coupled to the memory, the first electrostatic electrode, and the second electrostatic electrode.

29. The transceiver of claim 13, further comprises:

an amplifier; and a filter.

30. The transceiver of claim 13 wherein the power manager selectively couples the energy storage device to circuitry of the transceiver when the first energy level is greater than the second energy level.

31. The transceiver of claim 13 wherein the energy storage device is decoupled from circuitry of the transceiver when the second energy level is greater than the first energy level.

32. The transceiver of claim 13 wherein the rectifier is coupled to circuitry of the transceiver when the second energy level is sufficient to energize circuitry in the transceiver.

33. The transceiver of claim 13 further comprising a charger, coupled to the energy storage device and at least one of the first and second electrostatic electrodes, for charging the energy storage device with an electrostatic signal received by at least one of the first and second electrostatic electrodes.

34. A method for communicating by a transceiver having an energy storage device with a first energy level, the method comprising the steps of:

receiving a signal having a second energy level;

analyzing the first energy level and the second energy level; and responsive to the step of analyzing, selectively coupling the signal to circuitry of the transceiver when the second energy level is greater than the first energy level, whereby the signal energizes the transceiver to be functional.

35. The method of claim 34 for communicating by a transceiver, wherein the energy storage device is selected from a group consisting of: a rechargeable battery, a battery, and a capacitor.

36. The method of claim 34 for communicating by a transceiver, further comprising the step of, responsive to the step of analyzing the first energy level and second energy level, selectively couplings the energy storage device to circuitry of the transceiver when the first energy level is greater tan the second energy level.

37. The method of claim 34 for communicating by a transceiver, further comprising the step of decoupling the energy storage device from circuitry of the transceiver when the second energy level is greater than the first energy level.

38. The method of claim 34 for communicating by a transceiver, further comprising the step of coupling the signal to circuitry of the transceiver when the second energy level is sufficient to energize the transceiver.

39. The method of claim 34 for communicating by a transceiver, further comprising the step of charging the energy storage device with the signal.

* * * * *